(No Model.)
L. SMITH.
BICYCLE REST.
No. 571,700. Patented Nov. 17, 1896.
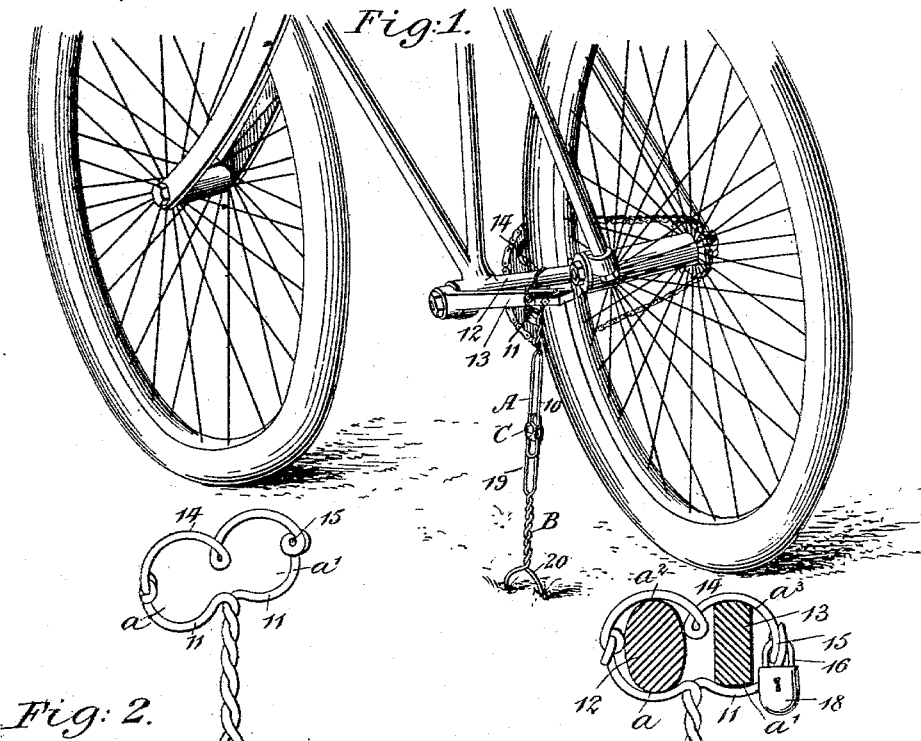
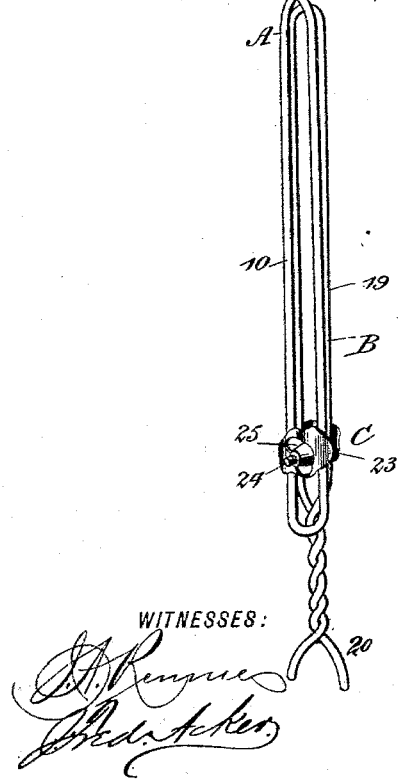
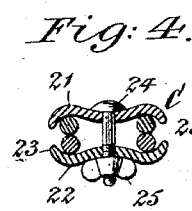
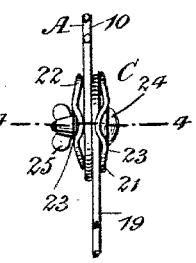
WITNESSES:
INVENTOR
L. Smith.
BY Munn & Co.
ATTORNEYS.

UNITED STATES PATENT OFFICE.

LEWIS SMITH, OF BROOKLYN, NEW YORK.

BICYCLE-REST.

SPECIFICATION forming part of Letters Patent No. 571,700, dated November 17, 1896.

Application filed October 22, 1895. Serial No. 566,455. (No model.)

*To all whom it may concern:*

Be it known that I, LEWIS SMITH, of Brooklyn, in the county of Kings and State of New York, have invented a new and Improved Bicycle-Rest, of which the following is a full, clear, and exact description.

My invention relates to a rest especially adapted for bicycles for the dual purpose of holding the bicycle in an upright position when the rider has dismounted and locking the pedal cranks to the frame of the bicycle in such manner that said bicycle cannot be ridden until the rest is detached therefrom; and the object of the invention is to provide a bicycle-rest which may be conveniently carried in the pocket or about the person or in a tool-bag, the rest being so made that it can be expeditiously and conveniently lengthened or shortened, and, furthermore, to construct the rest in such a manner that it may be quickly and expeditiously locked to the frame of the wheel.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the views.

Figure 1 is a perspective view of a portion of a bicycle, illustrating the application of the improved rest thereto. Fig. 2 is a perspective view of the bicycle-rest folded. Fig. 3 is a vertical section through a member of the bicycle-frame and pedal crank and a side elevation of the upper portion of the bicycle-rest, illustrating the manner in which it is secured to the said parts, and said Fig. 3 also illustrates a portion of the body of the bicycle-rest and the clamp employed in connection with the sections of the rest; and Fig. 4 is a longitudinal section through a clamp, the said section being taken practically on the line 4 4 of Fig. 3.

In carrying out the invention the bicycle-rest is preferably made in two sections, a head-section A and a foot-section B, the sections being made of any desired material. Usually, however, they are constructed of stout wire, as illustrated in the drawings, although the sections may be cast or forged if in practice it is found desirable.

In the construction of the head-section A said section is provided with a loop or link 10, which forms the major portion of its body and especially the lower portion thereof. At the upper end of the body of the said head-section an arm 11 is formed, extending in substantially a horizontal manner beyond opposite sides of the body, and the arm is concaved upon its upper face at each side of the body, the extremities of the arm being carried upward in substantially a vertical direction. This arm constitutes virtually the head of the rest, and the concavities in the head form sockets $a$ and $a'$, one socket being adapted for the reception of a rear lower brace 12 of the bicycle-frame and the other socket being adapted to receive a crank-arm 13 of the pedal shaft when said crank-arm is carried substantially parallel with the rear lower brace. The head portion of the head-section of the said bicycle-rest is provided with a keeper 14, pivotally connected with one extremity of the head and being adapted for engagement with the opposite extremity, and the free ends of the keeper and the said head are preferably provided with eyes 15, adapted to register in order that the hasp 16 of a padlock 18 or its equivalent may be employed to secure the keeper over the head, as shown in Fig. 3. The keeper is formed in substantially the same manner as the head, but its under face is concaved at each side of the center, forming sockets $a^2$ and $a^3$.

The foot-section of the rest consists of a body in which a link or a loop 19 is formed at what is the upper end of the body when the bicycle-rest is in operation, the lower end of the foot-section being preferably bifurcated or forked or otherwise formed to produce a foot 20. Preferably, however, the foot is produced by bifurcating the body portion of the foot-section, so that the members thus produced may enter the ground.

The links 10 and 19 of the two sections of the bicycle-rest are adapted to play one upon the other and are connected by a clamp C. (Shown in detail in Fig. 4.) This clamp preferably comprises two opposing plates 21 and 22, having their inner faces concaved at each side of the center and their side edges bent inwardly, forming virtually flanges 23, so that the said plates may be fitted snugly to the aforesaid links or loops in the sections of the rest. The plates are connected and are drawn together so as to clamp the rest-sections by means of a bolt 24, passed loosely through the plates and provided preferably with a thumb-nut 25 at one of its ends. It is therefore evident that when the thumb-nut is manipulated to relieve the sections of the rest from pressure between the plates of the clamp the said sections may be lengthened out or shortened, as may be required, or the sections may be folded one upon the other, as shown in Fig. 2, reducing the entire rest to such length that it may be conveniently placed in a tool-box or carried about the person. It is also evident that after the sections have been adjusted by screwing up the nut 25 they will be held in rigid engagement with each other. If the nut 25 is loosened sufficiently, the foot-section may be turned on the bolt 24 until the foot 20 is adjacent to the head of the section A.

In the application of the improved rest one of the crank-arms of the pedal-shaft is carried upward until it is substantially parallel with a rear lower brace of the bicycle-frame. The rest is then applied by causing the said brace to enter, for example, the socket $a$ in the head, the crank-arm being received in the opposing socket $a'$. The keeper is then carried over these sockets, engaging in a corresponding manner with the upper portion of the said brace and crank-arm, and the lock 18 is finally employed to lock the keeper to the head of the improved rest. When the rest is thus applied, it is evident that when its lower end or foot is in engagement with the ground, the bicycle will be held in an upright position after the rider has dismounted, and it is furthermore evident that while the rest remains upon the bicycle the said bicycle cannot be ridden, since the pedals cannot be worked.

Having thus described my invention, I claim as new and desire to secure by Letters Patent—

1. A bicycle-rest, the same comprising a head-section terminating at one end in a head having sockets formed therein and at its opposite end in a link, and a keeper having a hinged connection with the head at one end, being adapted for locking engagement therewith at the opposite end, a foot-section having a link formed at one of its ends, adapted to slide upon the link of the head-section, and a clamp connecting the link portions of the two sections, as and for the purpose set forth.

2. A bicycle-rest, the same comprising a head-section terminating at one end in a head having sockets formed therein and at its opposite end in a link, and a keeper having a hinged connection with the head at one end, being adapted for locking engagement therewith at the opposite end, a foot-section having a link formed at one of its ends, adapted to slide upon the link of the head-section, and a clamp connecting the link portions of the two sections, the same consisting of plates having their opposing sections curved to receive the links of the head and the foot sections and their side edges inwardly flanged, and a bolt connecting the two plates, said bolt being provided with a suitable nut, as and for the purpose specified.

3. In a bicycle-rest, the combination of a foot having a downwardly-extending portion adapted to engage the ground, and provided at its upper end with a head adapted to engage under one of the pedal-cranks and one of the frame-bars, and a keeper pivotally connected at one end to said head and adapted to extend across the upper side of the pedal-crank and frame-bar when the head is under the same, said keeper being adapted to be locked at its other end to the head, and forming between it and the head two sockets adapted to receive the said pedal-crank and frame-bar, substantially as set forth.

4. In a bicycle-rest, the combination of two sections adjustably connected and adapted to swing pivotally and slide upon each other, the lower section being adapted to rest on the ground, and the upper section being provided with a head adapted to engage under one of the pedal-cranks and one of the frame-bars, and a keeper pivoted at one end to the head and adapted to extend over the pedal-crank and frame-bar when the head is under the same, said keeper being adapted to be locked at its other end to the head and forming between it and the head two sockets adapted to receive the pedal-crank and frame-bar, substantially as set forth.

LEWIS SMITH.

Witnesses:
J. FRED. ACKER,
ALLAN W. SMITH.